United States Patent
Ito et al.

(10) Patent No.: US 7,395,266 B2
(45) Date of Patent: Jul. 1, 2008

(54) PORTABLE TERMINAL AND METHOD OF CONTROLLING THE SAME

(75) Inventors: Fumiyuki Ito, Kanagawa (JP); Hiroki Matsumoto, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 282 days.

(21) Appl. No.: 11/294,725

(22) Filed: Dec. 5, 2005

(65) Prior Publication Data

US 2006/0129925 A1    Jun. 15, 2006

(30) Foreign Application Priority Data

Dec. 6, 2004    (JP)    ............ P.2004-353371

(51) Int. Cl.
G06F 17/30    (2006.01)
G06F 15/16    (2006.01)
(52) U.S. Cl. ............................... 707/10; 707/1
(58) Field of Classification Search ............ 707/10
See application file for complete search history.

(56) References Cited

U.S. PATENT DOCUMENTS

2002/0069218 A1 * 6/2002 Sull et al. ............. 707/501.1

FOREIGN PATENT DOCUMENTS

JP    2004-133532    4/2004

* cited by examiner

*Primary Examiner*—Tony Mahmoudi
(74) *Attorney, Agent, or Firm*—Hogan & Hartson LLP

(57) ABSTRACT

There are provided a portable terminal and a method of controlling the same with which it is possible to choose and display only data that is useful for users among contents existing on a communication network. A browser unit acquires a desirable contents source from a website by using reference information. An analyzing unit analyzes whether or not link information is established to the image data designated in the acquired source by the browser unit, and whether or not the domain and home directory of the image data match with the domain and home directory of text data contained in the source. A display control unit determines display or non-display of image data which is designated in the source based on the result of analysis.

7 Claims, 5 Drawing Sheets

| A | B | C | DETERMINATION OF DISPLAY AND NON-DISPLAY |
|---|---|---|---|
| T | T | T | DISPLAY |
| T | T | F | DISPLAY |
| T | F | T | DISPLAY |
| T | F | F | NON-DISPLAY |
| F | T | T | DISPLAY |
| F | T | F | NON-DISPLAY |
| F | F | T | NON-DISPLAY |
| F | F | F | NON-DISPLAY |

FIG. 4

(1) < IMG SRC ="ADDRESS OF IMAGE DATA " >

(2) < A HREF= "      "><IMG SRC= " ADDRESS OF IMAGE DATA " >

FIG. 5

| A | B | C | DETERMINATION OF DISPLAY AND NON-DISPLAY |
|---|---|---|---|
| T | T | T | DISPLAY |
| T | T | F | DISPLAY |
| T | F | T | DISPLAY |
| T | F | F | NON-DISPLAY |
| F | T | T | DISPLAY |
| F | T | F | NON-DISPLAY |
| F | F | T | NON-DISPLAY |
| F | F | F | NON-DISPLAY |

PORTABLE TERMINAL AND METHOD OF CONTROLLING THE SAME

BACKGROUND OF THE INVENTION

1. Field of the Invention

The present invention relates to an improvement to a portable terminal and a method controlling the same which makes it possible to display contents existing on a communication network.

2. Description of the Related Art

Conventionally, a variety of arts has been proposed to display and inspect the contents existing on a communication network such as the internet or the like on a portable terminal.

For example, in JP-A-2004-133532, an information transforming system is disclosed, in which an information exchange device is provided between a web-server and a proxy server to transform image data and the like appropriately according to the size of a display screen of the portable terminal.

However, in the prior art, because data of large capacity such as an image is transmitted to the portable terminal whose transmission speed and imaging speed are slow, there was a problem that users were stressed due to taking time in data processing at the portable terminal.

To solve such a problem, for example, the existence or nonexistence of the image acquisition is established in the portable terminal side, but in the case where nonexistence of the image acquisition is established, a disadvantage arises that not even useful image for users can be acquired.

SUMMARY OF THE INVENTION

The present invention is made in consideration of the above problems and an advantage of the present invention is to provide a portable terminal and a method of controlling the same which can choose and display only the data that is useful for users among contents existing on a communication network.

In order to accomplish the above object, according to one aspect of the invention, there is provided a portable terminal which can display contents existing on a communication network comprising:

a source acquiring unit that acquires a desirable contents source from the website where the contents exists;

a source analyzing unit that analyzes whether or not the source contains data that is useless for the users ; and a display control unit that determines display or non-display with respect to predetermined data which is designated among source data based on the result of analysis.

Preferably, in the portable terminal according to one aspect of the invention, the source analyzing unit analyzes whether or not a link is established from the data designated in the acquired data sources to other data, and the display control unit determines display or non-display of the image display data based on the result of analysis.

Preferably, in the portable terminal according to one aspect of the invention, the source analyzing unit analyzes whether the image data designated in the acquired source is in the same domain as text data contained in the source, and the display control unit determines the display or non-display of the image data based on the result of analysis.

Preferably, in the portable terminal according to one aspect of the invention, the source analyzing unit determines whether or not the image data designated in the acquired source data is common with the text data contained in the source for the home directory, and the display control unit determines the display or non-display of the image data based on the result of analysis.

Preferably, in the portable terminal according to one aspect of the invention, the source analyzing unit analyzes whether or not a link is established from the data designated in the acquired data sources to other data, whether the image data is in the same domain as text data contained in the source, and whether or not the image data is common with the text data contained in the source for their home directory, and the display control unit determines display of the image data when the establishment of the link information does not exist, the image data is in the same domain as text data contained in the source, and the image data is common with the text data contained in the source for the home directory.

Preferably, in the portable terminal according to one aspect of the invention, the source analyzing unit analyzes whether or not a link is established from the data designated in the acquired sources to other data, whether the image data is in the same domain as text data contained in the source, and whether or not the image data is common with the text data contained in the source for the home directory, and the display control unit determines the display of the image data when the establishment of the link information does not exist, or the image data is in the same domain as text data contained in the source, or the image data is common with text data contained in the source for the home directory.

Preferably, in the portable terminal according to one aspect of the invention, the source analyzing unit analyzes whether or not a link is established from the data designated in the acquired data sources to other data, whether the image data is in the same domain as text data contained in the source, and whether or not the image data is common with the text data contained in the source for the home directory, and the display control unit grades the result of analysis and determines the display of the image data in the case where the sum of grades is not less than a predetermined threshold value.

According to the other aspect of the invention, there is provided a method of controlling a portable terminal which can display contents existing on a communication network, the method comprising the steps of:

acquiring a source of desirable contents from a website where the contents exist;

analyzing the acquired source; and determining display or non-display with respect to predetermined data in the source based on the result of analysis.

According to another aspect of the invention, there is provided a portable terminal which can display contents existing on a communication network comprising:

means for acquiring a source of desirable contents from a website where the contents exist;

means for analyzing the acquired source; and means for determining display or non-display with respect to predetermined data in the source based on the result of analysis.

According to the present invention, it is possible to choose and display only data that is useful for users because the display and non-display is determined with respect to the predetermined data in the source based on the result of source analysis.

BRIEF DESCRIPTION OF THE DRAWINGS

Now, a preferred embodiment of the present invention will be described with reference to the drawings.

FIG. 4 illustrates an example of a source described with HTML;

FIG. 5 illustrates another example of method of determining the display or non-display of the image data.

DESCRIPTION OF THE PREFERRED EMBODIMENTS

Figure 1:
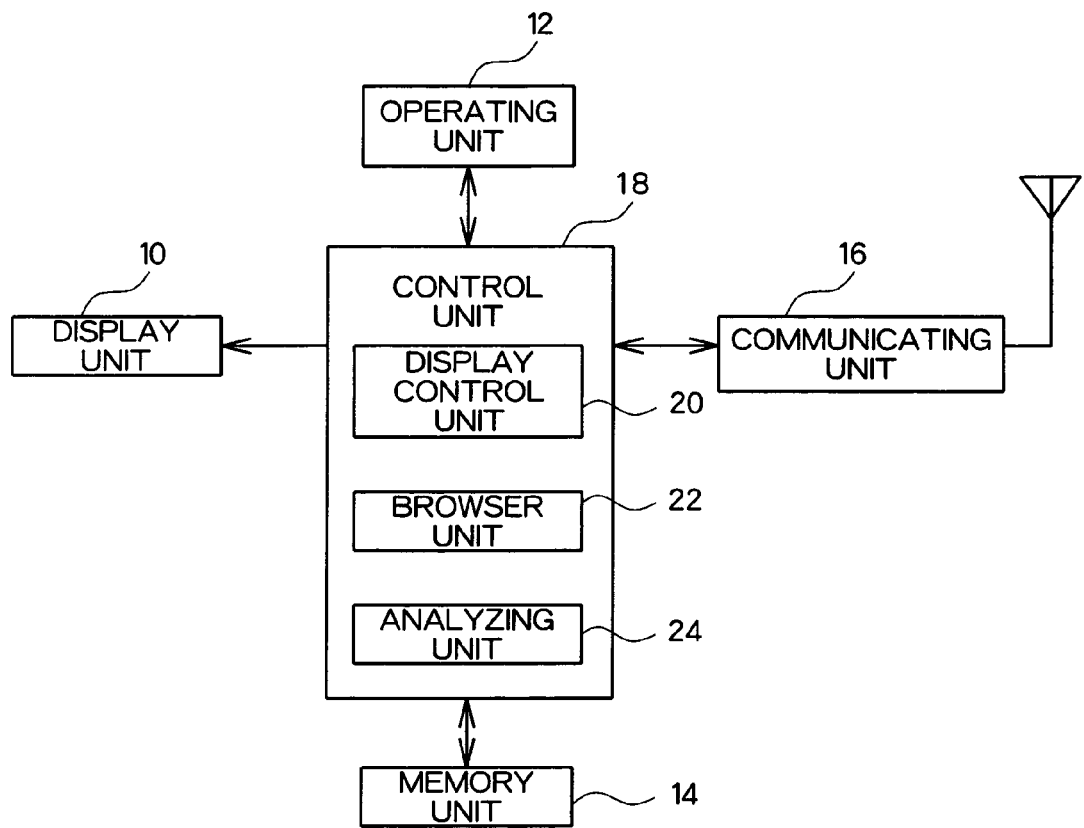
FIG. 1 is a block diagram showing a constitution of a portable terminal according to an embodiment of the present invention.

In FIG. 1, a block diagram of a constitution of a portable terminal according to an embodiment of the present invention is shown. In FIG. 1, the portable terminal comprises a display unit 10, an operating unit 12, a memory unit 14, a communicating unit 16 and a control unit 18.

The display unit 10, for example, consists of a liquid crystal display or the like, and displays the details of key input such as character data, numerical data, various kinds of figures, the details of contents on a communication network and the like.

The key input is performed by the operating unit 12 shown in FIG. 1. The operating unit 12, for example, consists of an operating button of the portable terminal and the like.

The memory unit 14, for example, consists of a working RAM as a main memory of the operating unit 18, an EEPROM as a nonvolatile memory, a magnetic storage medium and the like, and stores data such as the details of key input or the details of contents, and a program.

The communicating unit 16 communicates with a base station by a known method to realize the communication function as a portable communication terminal.

The control unit 18, for example, consists of a CPU and the like, and controls the operations of the display unit 10, the operating unit 12, the memory unit 14, and the communicating unit 16 while transmitting and receiving data therewith.

A display control unit 20 of the control unit 18 controls the details displayed on the display unit 10. The display includes the contents on the communication network, and the display control unit 20 performs a process for determining display or non-display with respect to predetermined data designated in the sources of the contents based on the analysis result of an analyzing unit 24.

In addition, a browser unit 22 accesses contents using the reference information for referring contents which exist on the communication network, and receives a source of contents from a desired website for conversion into display data. The contents may include voice data. In this case, the browser unit 22 is composed to output voice from a voice reproduction unit which is included in the communicating unit 16. Furthermore, as the reference information, a URL (Uniform Resource Locator) specifying the contents on the Internet and designating the address of the contents or the like can be used. Here, the browser unit 22 functions as source acquiring means of the present invention.

In addition, an analyzing unit 24 analyzes the characteristics of the contents source which is acquired by the browser unit 22. The details of the analysis are, for example, whether the link information is established to the image data, whether or not the image data is in the same domain as text data contained in the source, and whether or not the image data is common with the text data contained in the source for the home directory and the like.

In addition, the above-described control unit 18 may be a computer constituted mainly by a CPU. In this case, the CPU executes the program stored in medium such as a memory card and thus each function of the control unit 18 can be realized.

Figure 2:
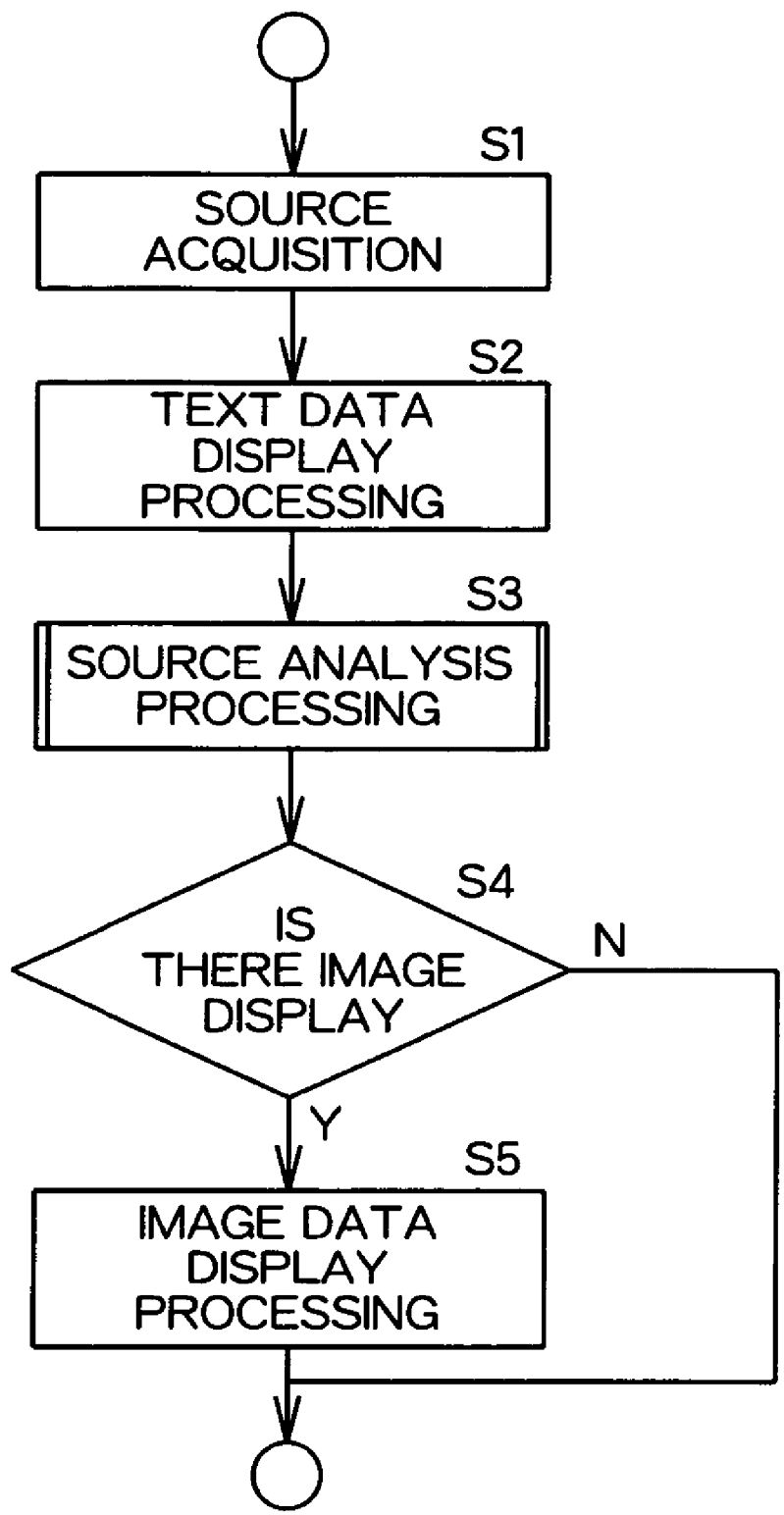
FIG. 2 is a flow chart illustrating an example of the operation of the portable terminal shown in FIG. 1.

FIG. 2 is a flow chart illustrating an example of the operation of the portable terminal shown in FIG. 1 In FIG. 2, when the browser unit 22 acquires a desirable contents source by using the reference information from the web site (S1), the browser unit 22 converts text data contained in the source to display data, and thus the display control unit 20 displays the display data on a display screen of the display unit 10 (S2).

In addition, the analyzing unit 24 analyzes the source acquired by the browser unit 22, and the display control unit 20 determines the display or non-display of image data designated in the sources based on the result of analysis (S3).

Here, the analyzing unit 24 functions as a source analyzing unit of the present invention.

In step S3, when the display control unit determines the display of image data (S4), the browser unit 22 converts the image data to display data, and the display control unit 20 displays the display data on a display screen of the display unit 10 (S5).

Also, in step S4, when the display control unit determines the non-display of image data, the process of S5 is not performed.

Figure 3:
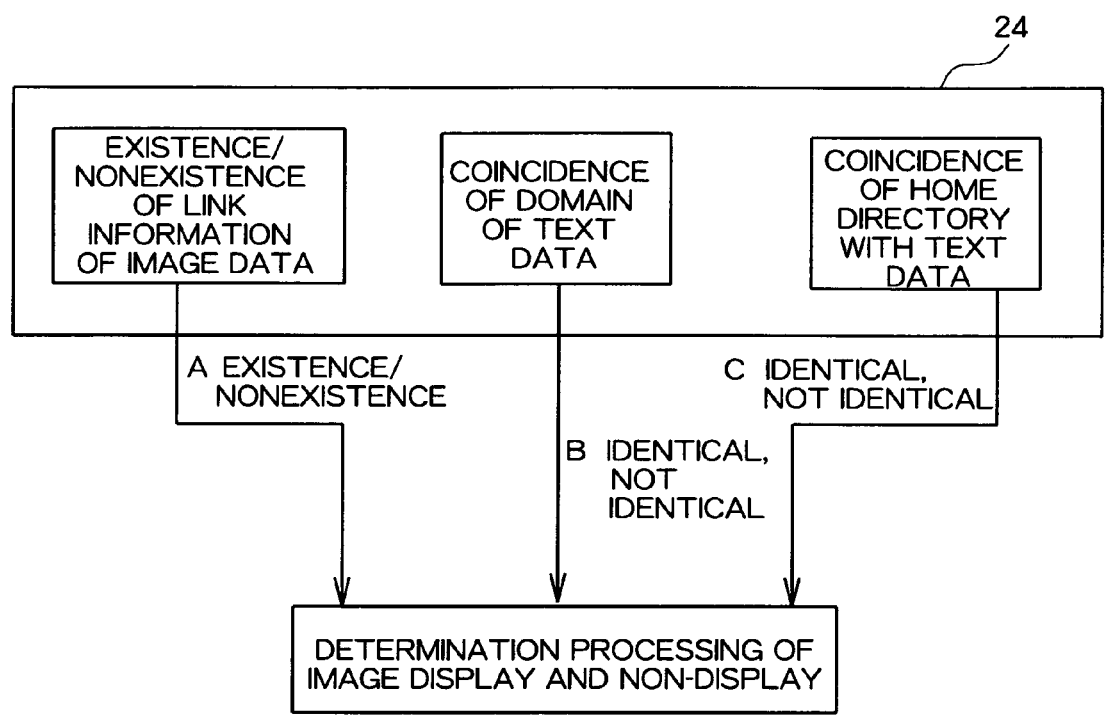
FIG. 3 illustrates an example of source analyzing process.

FIG. 3 illustrates an example of a source analyzing process shown in S3 of FIG. 2.

In FIG. 3, the analyzing unit 24 analyzes whether or not the link information is established to the image data designated in the sources acquired by the browser unit 22, and transfers the result A of existence or non-existence of the link information to the display control unit 20.

The existence or non-existence of establishment of this link information can be determined regarding whether the description form of the link information corresponds to (1) or (2) in FIG. 4, when a source is described in the form of HTML.

The analyzing unit 24 determines that link information is not established to the image data in the case of description form (1), and that link information is established to the image data in the case of description form (2).

In the case that link information is established to image data, it can be determined that image data such as logo display or banner advertisement is not useful for users, and that the necessity of display is low.

In addition, the analyzing unit 24 also determines whether or not the domain and home directory of the image data match with the domain and home directory of text data contained in the source, and transfers the result B of identical or non-identical for the domain and the result C of identical or non-identical for the home directory to the display control unit 20.

Here, in the case that the address of text data, image data and the like are shown in the form of URL, the URL is described in the form of http://domain/home directory/sub directory. The domain represents a server on the communication network and a sub tree of home directory represents the position in the server. Accordingly, the analyzing unit 24 analyzes the URL representing the existence positions of text data and image data, and determines identity or non-identity of the domain and the home directory. If the domain of the URL is matched, the text data and image data are in the same domain, and if the home directory of URL is matched, the home directories of text data and image data are common.

It can be considered that the image data for which domain directory and home directory do not match with the text data exists in the server storing image data commonly used in various documents, and so it is highly possible that the image data such as logo display or banner advertisement is not useful for a user. Therefore, it can be determined that the necessity of display is low.

In the display control unit 20, when it receives the information A regarding whether or not the link information is established to the image data, the information B regarding whether or not the text data and the image data are in the same domain, and the information C regarding whether or not the home directory is common in the text data and the image data, the display or non-display of the image data is determined on the basis of these results. This determination, for example, includes a method in which the display of the image data is determined only in the following case: wherein information A has no link information AND information B corresponds to the domain AND information C is common with the home directory(AND condition). In addition, it is possible that the display of the image data is determined in the following case: wherein information A has no link information OR information B corresponds to the domain OR information C is common with the home directory(OR condition). Moreover, it is possible that the display of the image data is determined in the following case: wherein information A, B and C are converted to a grade, and a sum of the grades of each of the information is more than a predetermined threshold value. In this conversion of the information to grades, priority allocation of marks is preferably performed on the basis of the importance of each of the information: wherein, for example, 50 points are allocated when the information (A) has no link information, 20 points when the information B corresponds to the domain, and 30 points when the information C is common with the home directory. Thus, the determination of the display or non-display of the image data is optimized.

Furthermore, in FIG. 5, another example of a method of determining the display or non-display of the image data is illustrated. In FIG. 5, T represents that link information does not exist and F represents that link information exists in information A; T represents that the domain is identical and F represents that the domain is not identical in information B; T represents that home directory is common and F represents that home directory is not common in information C. The results as to whether or not the image data is displayed, which is determined based on the combination of T and F of the information A, B and C, are shown in a box of the display or non-display determination. As such, by determining the display or non-display of the image data based on the combination of T and F of the information A, B and C, the proper grading can be performed with respect to information A, B and C, so that proper judgment is possible.

Figure 6A:
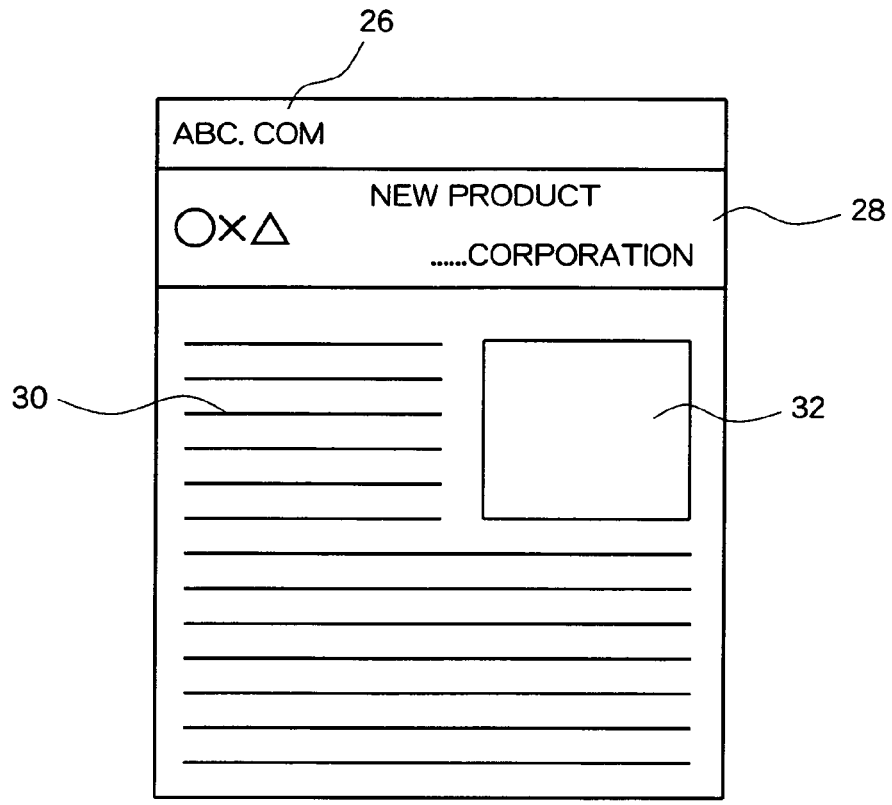
FIG. 6a shows an example of a display screen of the portable terminal.
Figure 6B:
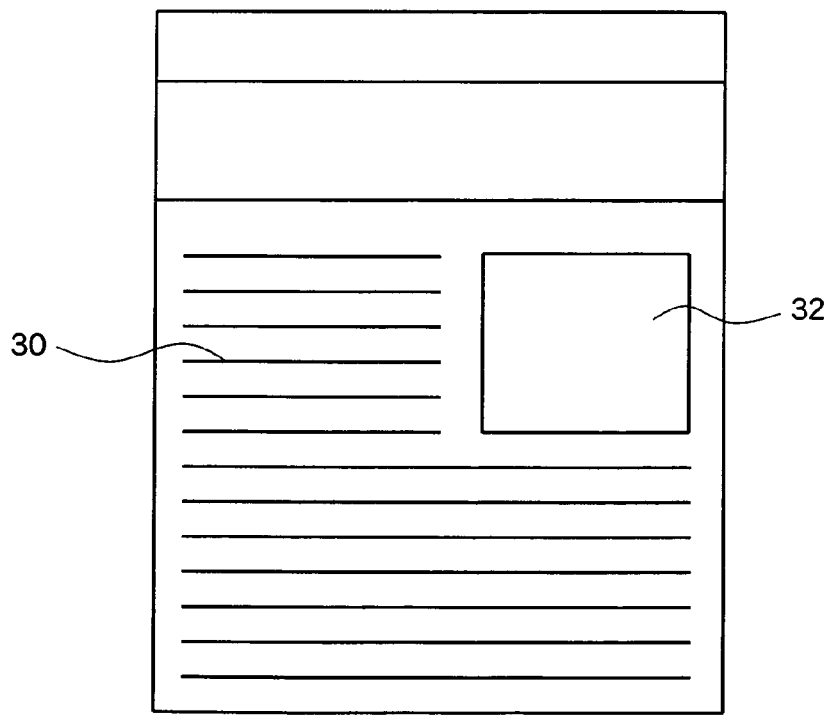
FIG. 6b shows an example of a display screen of the portable terminal.

FIG. 6a shows an example of a display screen of the portable terminal on which all image data are displayed, and FIG. 6b shows an example of a display screen of the portable terminal according to the present embodiment.

In FIG. 6a, logo 26 and banner advertisement 28 are displayed together with text data 30 and a photographic image 32. Contrary to this, in FIG. 6b, because the display control unit 20 does not perform the display of logo 26 and banner advertisement 28 based on the analysis result of the source by the analyzing unit 24, only text data 30 and a photographic image 32 which are useful for users are displayed. Furthermore, in this case, the display section of the logo 26 and banner advertisement 28 is left blank. Accordingly, because it does not need to display unnecessary image data, data processing time in the portable terminal can be reduced.

What is claimed is:

1. A portable terminal which displays contents existing on a communication network, comprising:
    a source acquiring unit that acquires a desirable contents source from a website where the contents exist;
    a source analyzing unit that analyzes whether or not the source contains data that is useless for a user, the source analyzing unit analyzes whether or not a link is established from the image data designated in the acquired source to other data, whether the image data is in the same domain as text data contained in the source, and whether or not the image data is common with the text data contained in the source for the home directory; and
    a display control unit that determines display or non-display with respect to predetermined data which is designated in the source based on the result of analysis, the display control unit determines the display of the image data when the establishment of the link information does not exist, the image data is in the same domain as text data contained in the source, and the image data is common with the text data contained in the source for the home directory.

2. A portable terminal which displays contents existing on a communication network, comprising:
    a source acquiring unit that acquires a desirable contents source from a website where the contents exist;
    a source analyzing unit that analyzes whether or not the source contains data that is useless for a user, the source analyzing unit analyzes whether or not a link is established from the image data designated in the acquired source to other data, whether the image data is in the same domain as text data contained in the source, and whether or not the image data is common with the text data contained in the source for the home directory; and
    a display control unit that determines display or non-display with respect to predetermined data which is designated in the source based on the result of analysis, the display control unit determines the display of the image data when the establishment of the link information does not exist, the image data is in the same domain as text data contained in the source, or the image data is common with the text data contained in the source for the home directory.

3. A portable terminal which displays contents existing on a communication network, comprising:
    a source acquiring unit that acquires a desirable contents source from a website where the contents exist;
    a source analyzing unit that analyzes whether or not the source contains data that is useless for a user, the source analyzing unit analyzes whether or not a link is established from the image data designated in the acquired source to other data, whether the image data is in the same domain as text data contained in the source, and whether or not the image data is common with the text data contained in the source for the home directory; and
    a display control unit that determines display or non-display with respect to predetermined data which is designated in the source based on the result of analysis, the display control unit grades the result of analysis and determines the display of the image data when the sum of grades is not less than the predetermined threshold value.

4. A portable terminal which displays contents existing on a communication network, comprising:
    means for acquiring a source of desirable contents from a website where the contents exist;

means for analyzing whether or not the source contains data that is useless for a user, the means for analyzing analyzes whether or not a link is established from the image data designated in the acquired source to other data, whether the image data is in the same domain as text data contained in the source, and whether or not the image data is common with the text data contained in the source for the home directory; and means for determining display or non-display with respect to predetermined data which is designated in the source based on the result of analysis, the means for determining display or non-display determines the display of the image data when the establishment of the link information does not exist, the image data is in the same domain as text data contained in the source, and the image data is common with the text data contained in the source for the home directory.

5. A portable terminal which displays contents existing on a communication network, comprising:

means for acquiring a source of desirable contents from a website where the contents exist;

means for analyzing whether or not the source contains data that is useless for a user, the means for analyzing analyzes whether or not a link is established from the image data designated in the acquired source to other data, whether the image data is in the same domain as text data contained in the source, and whether or not the image data is common with the text data contained in the source for the home directory; and means for determining display or non-display with respect to predetermined data which is designated in the source based on the result of analysis, the means for determining display or non-display determines the display of the image data when the establishment of the link information does not exist, or the image data is in the same domain as text data contained in the source, or the image data is common with text data contained in the source for the home directory.

6. A method of displaying contents existing on a communication network on a portable terminal comprising:

acquiring a desirable contents source from a website where the contents exist;

analyzing the source to determine whether or not the source contains data that is useless for a user, analyzing the source comprises analyzing whether or not a link is established from the image data designated in the acquired source to other data, whether the image data is in the same domain as text data contained in the source, and whether or not the image data is common with the text data contained in the source for the home directory; and determining display or non-display with respect to predetermined data which is designated in the source based on the result of analysis, determining display or non-display comprises determining the display of the image data when the establishment of the link information does not exist, the image data is in the same domain as text data contained in the source, and the image data is common with the text data contained in the source for the home directory.

7. A method of displaying contents existing on a communication network on a portable terminal comprising:

acquiring a desirable contents source from a website where the contents exist;

analyzing the source to determine whether or not the source contains data that is useless for a user, analyzing the source comprises analyzing whether or not a link is established from the image data designated in the acquired source to other data, whether the image data is in the same domain as text data contained in the source, and whether or not the image data is common with the text data contained in the source for the home directory; and determining display or non-display with respect to predetermined data which is designated in the source based on the result of analysis, determining display or non-display comprises determining the display of the image data when the establishment of the link information does not exist, or the image data is in the same domain as text data contained in the source, or the image data is common with text data contained in the source for the home directory.

* * * * *